(12) United States Patent
Lu et al.

(10) Patent No.: US 12,055,708 B2
(45) Date of Patent: *Aug. 6, 2024

(54) HADAMARD MASK FOR IMPROVING DETECTION RESOLUTION DURING A SCANNING PROCEDURE OF AN OPTICAL SENSING SYSTEM

(71) Applicant: BEIJING VOYAGER TECHNOLOGY CO., LTD., Beijing (CN)

(72) Inventors: Yue Lu, Los Gatos, CA (US); Youmin Wang, Berkeley, CA (US)

(73) Assignee: BEIJING VOYAGER TECHNOLOGY CO., LTD., Beijing (CN)

(*) Notice: Subject to any disclaimer, the term of this patent is extended or adjusted under 35 U.S.C. 154(b) by 327 days.

This patent is subject to a terminal disclaimer.

(21) Appl. No.: 17/552,946

(22) Filed: Dec. 16, 2021

(65) Prior Publication Data

US 2023/0185084 A1 Jun. 15, 2023

Related U.S. Application Data

(63) Continuation-in-part of application No. 17/552,223, filed on Dec. 15, 2021.

(51) Int. Cl.
*G02B 26/10* (2006.01)
*G01S 7/481* (2006.01)
*G02B 26/12* (2006.01)

(52) U.S. Cl.
CPC .......... *G02B 26/105* (2013.01); *G01S 7/4817* (2013.01); *G02B 26/124* (2013.01)

(58) Field of Classification Search
CPC ... G02B 26/105; G02B 26/124; G01S 7/4817; G01S 7/4816; G01S 7/486; G01S 17/89
See application file for complete search history.

(56) References Cited

U.S. PATENT DOCUMENTS

| | | | |
|---|---|---|---|
| 10,670,719 B2* | 6/2020 | Wang | G02B 27/0961 |
| 2010/0033788 A1* | 2/2010 | Xie | G06Q 10/06 438/106 |
| 2013/0113921 A1* | 5/2013 | Richards | H04N 25/48 348/135 |
| 2019/0064508 A1* | 2/2019 | Torkkeli | G02B 26/101 |
| 2020/0209615 A1* | 7/2020 | Lee | B81C 1/00404 |
| 2020/0393545 A1* | 12/2020 | Shani | G01S 17/894 |
| 2022/0307903 A1* | 9/2022 | Zhou | G01J 3/0208 |

* cited by examiner

*Primary Examiner* — Tarifur R Chowdhury
*Assistant Examiner* — Carlos Perez-Guzman
(74) *Attorney, Agent, or Firm* — BAYES PLLC (57) ABSTRACT

Embodiments of the disclosure include a mask apparatus used in an optical sensing system. The apparatus may include an optical encoding mask configured to facilitate a scanning procedure of the optical sensing system, wherein the scanning procedure comprises a plurality of scanning lines. The apparatus may further include an actuator coupled to the optical encoding mask and configured to generate a force to drive the optical encoding mask to resonate in a direction perpendicular to the scanning lines during the scanning procedure.

20 Claims, 8 Drawing Sheets

HADAMARD MASK FOR IMPROVING DETECTION RESOLUTION DURING A SCANNING PROCEDURE OF AN OPTICAL SENSING SYSTEM

CROSS-REFERENCE TO RELATED APPLICATION(S)

This application is a continuation-in-part of U.S. application Ser. No. 17/552,223, entitled "A RECEIVER WITH A HADAMARD MASK FOR IMPROVING DETECTION RESOLUTION DURING A SCANNING PROCEDURE OF AN OPTICAL SENSING SYSTEM" and filed on Dec. 15, 2021, which is expressly incorporated by reference herein in its entirety.

TECHNICAL FIELD

The present disclosure relates to an apparatus for an optical sensing system configured to provide sub-pixelization of an image frame of the far field environment, and more particularly, to a Hadamard mask, driven by an actuator and at least one displacement amplifier, to resonate during a scanning procedure of the optical sensing system.

BACKGROUND

Optical sensing systems, e.g., such as LiDAR systems, have been widely used in advanced navigation technologies, such as to aid autonomous driving or to generate high-definition maps. For example, a typical LiDAR system measures the distance to a target by illuminating the target with pulsed laser light beams that are steered towards an object in the far field using a scanning mirror, and then measuring the reflected pulses with a sensor. Differences in laser light return times, wavelengths, and/or phases (also referred to as "time-of-flight (ToF) measurements") can then be used to construct digital three-dimensional (3D) representations of the target. Because using a narrow laser beam as the incident light can map physical features with very high resolution, a LiDAR system is particularly suitable for applications such as sensing in autonomous driving and high-definition map surveys.

Earlier iterations of optical sensing systems included electromechanical systems that were mounted on bases, which rotated mechanically to emit laser light in 360 degrees. In such systems, the optical sensor rotates to sense the surrounding area. These moving parts are manufactured with a high degree of precision to ensure measurements are obtained with a suitable degree of accuracy for autonomous navigation. Achieving this high level of precision is expensive and time consuming. For example, to achieve a desired detection resolution, the moving parts have to include large arrays of laser emitters and detectors. The large number of emitters and detector do not only increase the size of the moving parts, making it difficult to manufacture and assemble, the arrays also need to be precisely aligned to achieve the detection accuracy. In addition, moving parts may make the optical sensor less resilient to vibrations. Driving in rough terrain, for example, may negatively impact ToF measurements.

To overcome some of the problems of electromechanical systems, solid-state optical sensing systems and/or semi-solid-state optical sensing systems have been introduced with fewer moving parts. A solid-state system has two scanning axis, at least one of which is a solid-state axis implemented by a solid-state scanner, such as a microelectromechanical system (MEMS) scanning mirror or mirror array. The solid-state optical sensing system typically uses a 1D laser array as the laser source, such as an edge emitting laser bar with a plurality of emitters, and a 1D photodetector array. By using the rotating scanners, the laser emitter array and the photodetector array can be stationary and not part of the moving parts. While reducing the number of moving parts, conventional solid-state systems still face numerous challenges. One such challenge relates to the size of the laser array and photodetector array used in such systems. For example, to achieve a pixel number suitable for the resolution requirement of autonomous navigation, the size of the laser array and photodetector array used in such systems must be quite large. As a result, the pre-alignment issue persists and the manufacturing cost remains prohibitive.

Thus, there is a need for a solid-state optical sensing system that achieves the resolution requirement for autonomous-driving applications, while at the same time reducing the size of the laser array and the photodetector array, as compared to known systems.

SUMMARY

Embodiments of the disclosure include a mask apparatus used in an optical sensing system. The mask apparatus may include an optical encoding mask configured to facilitate a scanning procedure of the optical sensing system, where the scanning procedure comprises a plurality of scanning lines. The mask apparatus may further include an actuator coupled to the optical encoding mask and configured to generate a force to drive the optical encoding mask to resonate in a direction perpendicular to the scanning lines during the scanning procedure.

Embodiments of the disclosure may include a mask apparatus used in an optical sensing system. The mask apparatus may include a mask including a plurality of patterns. The mask apparatus may further include an actuator coupled to the mask and configured to generate a force to drive the mask to resonate in a direction perpendicular to the patterns. The mask and the actuator are formed in a same MEMS structure.

Embodiments of the disclosure may include a method of forming a mask apparatus. The method may include forming an actuator configured to generate a force. The method may also include forming one or more mechanical amplifiers coupled between the mask and the actuator, the one or more mechanical amplifiers being configured to amplify a displacement associated with the force generated by the actuator. The method may further include forming an optical encoding mask that is coupled to the actuator, the optical encoding mask being configured to resonate when driven by the mechanical quantity. The optical encoding mask, the actuator, and the one or more mechanical amplifiers may be formed in a same microelectromechanical system (MEMS) structure.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

LiDAR is an optical sensing technology that enables autonomous vehicles to "see" the surrounding world, creating a virtual model of the environment to facilitate decision-making and navigation. An optical sensor (e.g., LiDAR transmitter and receiver) creates a 3D map of the surrounding environment using laser beams and time-of-flight (ToF) distance measurements. ToF, which is one of LiDAR's operational principles, provides distance information by measuring the travel time of a collimated laser beam to reflect off an object and return to the sensor. Reflected light signals are measured and processed at the vehicle to detect, identify, and decide how to interact with or avoid objects.

Due to the challenges imposed by the prohibitive size of the laser array and photodetector array that achieve a desired detection resolution in conventional solid-state systems, as discussed in the BACKGROUND section above, the present disclosure provides a Hadamard mask configured to resonate during a scanning procedure to provide sub-pixelization of a frame captured using a laser array and photodetector array of reduced size. The Hadamard mask may include, e.g., a frame beginning pattern corresponding to a start of a frame captured during the scanning procedure and a coded pattern including multiple rows of coded regions arranged in a grid configured to provide sub-pixelization of the frame. More specifically, the Hadamard mask of the present disclosure is configured to resonate in front of the photodetector array to align each of its rows with the photodetector array in a sequential manner. The photodetector array may be configured to sequentially detect light passing through a slit apparatus (e.g., located between the Hadamard mask and the far field environment) and impinging on each of the plurality of rows of the Hadamard mask grid individually. The Hadamard mask may resonate according to a timing sequence. As a result, at different times, the light received by the photodetector array is filtered by different spatial filters and therefore, the sequentially received light signals are time-spatial encoded.

In some embodiments, the Hadamard mask may be coupled to an actuator (e.g., piezoelectric actuator, electric actuator, mechanical actuator, electromechanical actuator, etc.) configured to generate a displacement force, which causes the Hadamard mask to resonate during the scanning procedure. For example, piezoelectric actuators provide a high operating bandwidth and large forces in a very compact size and are typically capable of low-strain and high-force output. Moreover, piezoelectric actuators may provide a direct conversion of an electric potential applied by one or more electrodes to mechanical work (referred to hereinafter as "displacement force"). Thus, piezoelectric actuators may be useful in situations where high accuracy and fast response motions are beneficial. For these reasons, a piezoelectric actuator may be included in the present optical sensing system to cause the Hadamard mask to resonate during the scanning procedure. However, one potential disadvantage of piezoelectric actuators is their relatively short displacement distance (e.g., ~15-20 μm). Thus, when directly coupled to the Hadamard mask, the displacement distance of the piezoelectric actuator may be insufficient to cause the Hadamard mask to resonate according to the timing sequence of the scanning procedure described herein.

To overcome this potential disadvantage, the present disclosure couples one or more mechanical amplifiers between the actuator (piezoelectric or otherwise) and the Hadamard mask. The displacement amplifiers may be configured to amplify the displacement force generated by the actuator, which enlarges the displacement of the Hadamard mask, thus enabling the Hadamard mask to resonate to a requisite scale during the scanning procedure to provide sub-pixelization. By implementing sub-pixelization using a Hadamard mask that is caused to resonate using an actuator and one or more displacement amplifiers, the size and cost of the laser array and/or the photodetector array of the present optical sensing system may be considerably reduced as compared to conventional systems.

Some exemplary embodiments are described below with reference to a receiver used in LiDAR system(s), but the application of the mask apparatus disclosed by the present disclosure is not limited to the LiDAR system. Rather, one of ordinary skill would understand that the following description, embodiments, and techniques may apply to any type of optical sensing system (e.g., biomedical imaging, 3D scanning, tracking and targeting, free-space optical communications (FSOC), and telecommunications, just to name a few) known in the art without departing from the scope of the present disclosure.

Figure 1:
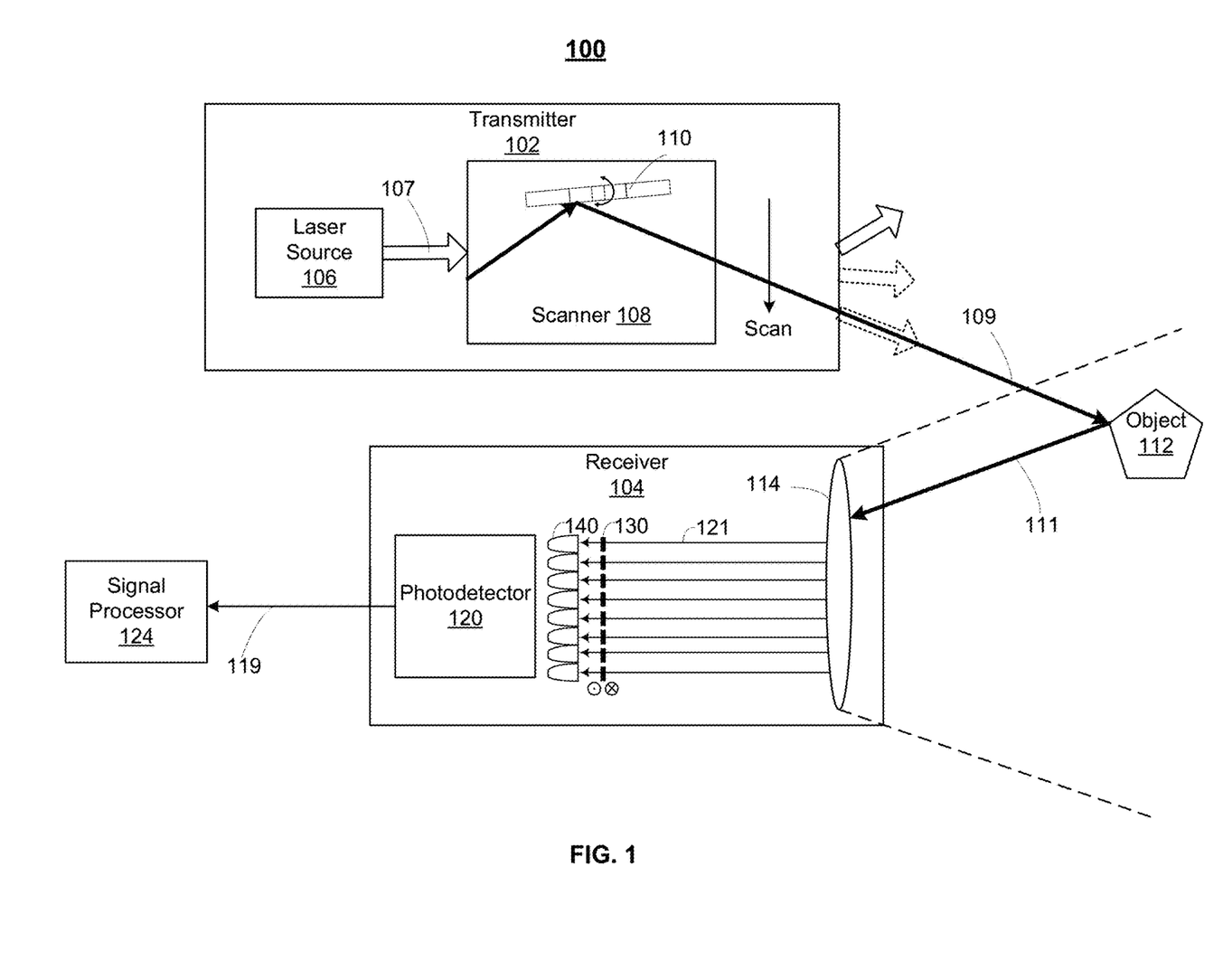
FIG. 1 illustrates a block diagram of an exemplary LiDAR system, according to embodiments of the disclosure.

FIG. 1 illustrates a block diagram of an exemplary LiDAR system 100, according to embodiments of the disclosure. LiDAR system 100 may include a transmitter 102 and a receiver 104. Transmitter 102 may emit laser beams along multiple directions. Transmitter 102 may include one or more laser sources 106 and a scanner 108.

Transmitter 102 can sequentially emit a stream of pulsed laser beams in different directions within a scan range (e.g., a range of scanning angles in angular degrees), as illustrated in FIG. 1. Laser source 106 may be configured to provide a laser beam 107 (also referred to as "native laser beam") to scanner 108. In some embodiments of the present disclosure, laser source 106 may generate a pulsed laser beam in the ultraviolet, visible, or near infrared wavelength range. Laser beam 107 may diverge in the space between the laser source 106 and the scanner 108. Thus, although not illustrated, transmitter 102 may further include a collimating lens located between laser source 106 and scanner 108 and configured to collimate divergent laser beam 107 before it impinges on scanner 108.

In some embodiments of the present disclosure, laser source 106 may include a pulsed laser diode (PLD), a vertical-cavity surface-emitting laser (VCSEL), a fiber laser, etc. For example, a PLD may be a semiconductor device similar to a light-emitting diode (LED) in which the laser beam is created at the diode's junction. In some embodiments of the present disclosure, a PLD includes a PIN diode in which the active region is in the intrinsic (I) region, and the carriers (electrons and holes) are pumped into the active region from the N and P regions, respectively. Depending on the semiconductor materials, the wavelength of incident laser beam 107 provided by a PLD may be greater than 700 nm, such as 760 nm, 785 nm, 808 nm, 848 nm, 905 nm, 940 nm, 980 nm, 1064 nm, 1083 nm, 1310 nm, 1370 nm, 1480 nm, 1512 nm, 1550 nm, 1625 nm, 1654nm, 1877 nm, 1940 nm, 2000 nm, etc. It is understood that any suitable laser source may be used as laser source 106 for emitting laser beam 107.

Scanner 108 may be configured to steer a laser beam 109 towards an object 112 (e.g., stationary objects, moving objects, people, animals, trees, fallen branches, debris, metallic objects, non-metallic objects, rocks, rain, chemical compounds, aerosols, clouds and even single molecules, just to name a few) in a direction within a range of scanning angles. In some embodiments consistent with the present disclosure, scanner 108 may include a micromachined mirror assembly (also referred to herein as "scanning mirror assembly") that is comprised of a plurality of elements. One such element is a scanning mirror, such as a MEMS mirror 110 illustrated in FIG. 1. Although not shown in FIG. 1, the scanning mirror assembly of scanner 108 may also include various other elements. For example, these other elements may include, without limitation, a MEMS actuator, actuator anchor(s), a plurality of interconnects, scanning mirror anchor(s), just to name a few.

In some embodiments, receiver 104 may be configured to detect a returned laser beam 111 returned from object 112. Returned laser beam 111 may be returned from object 112 and have the same wavelength as laser beam 109. Returned laser beam 111 may be in a different direction from laser beam 109. Receiver 104 can collect laser beams returned from object 112 and output electrical signals reflecting the intensity of the returned laser beams. Upon contact, laser beam 109 can be reflected by object 112 via backscattering, e.g., such as Raman scattering and/or fluorescence.

Figure 2A:
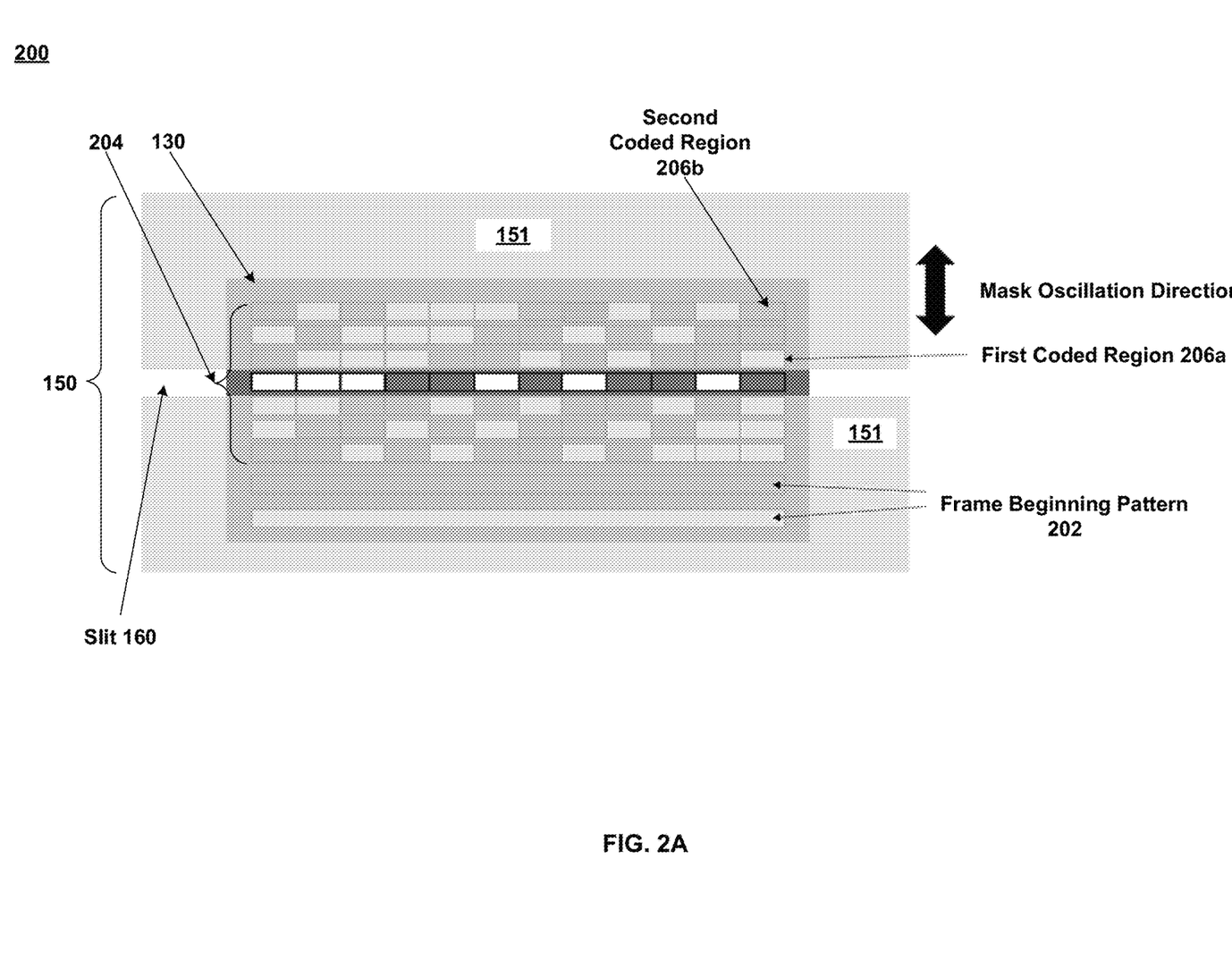
FIG. 2A illustrates a detailed view of an exemplary Hadamard mask and slit apparatus, according to embodiments of the disclosure.

As illustrated in FIG. 1, receiver 104 may receive the returned laser beam 111. Receiver 104 may include, among others, a lens 114, a slit apparatus (e.g., such as slit apparatus 150 depicted in FIG. 2A), a Hadamard mask 130, a light collector array 140, and a photodetector array 120. Lens 114 may be configured to collect light from a respective direction in its FOV and converge the laser beam 121 to focus before it is received on the slit apparatus. The slit apparatus may include opaque regions (as shown in FIG. 2A) that block light passage and a slit (also as shown in FIG. 2A) or transparent region that enables light passage through to Hadamard mask 130.

Hadamard mask 130 may be part of a Hadamard mask apparatus that further includes an actuator, displacement amplifier(s), a support structure, a handle, and/or one or more torsion springs as described below in connection with FIGS. 2C and 2D. During operation, the components of the Hadamard mask apparatus may be configured to cause the Hadamard mask 130 to resonate during a scanning procedure of LiDAR system 100.

Hadamard mask 130 may include a frame beginning pattern configured to indicate the start of scan associated with a new frame. In certain implementations, the start of the scan may be associated with a new scanning angle of the scanning procedure. Moreover, Hadamard mask 130 may include a coded pattern comprised of a plurality of coded regions arranged in a plurality of rows and/or a grid, as shown in FIGS. 2A, 2C, and 2D. Each of the plurality of rows may include X number of coded regions designed to pass light and Y number of coded regions designed to block light. The transparent and opaque regions (also referred to as "mask elements") all have an equal or substantially equal size and are distributed in a pre-determined pattern, which is placed on a regular grid that includes a plurality of rows of coded regions as illustrated in FIG. 2A. The width of the slit in the slit apparatus may be the same or similar as a single row of Hadamard mask 130 such that at each point in time light impinges on a single row of the mask during the line-scanning procedure. In the example illustrated in FIG. 1, Hadamard mask 130 may resonate in and out of the plane of the page by the application of a displacement force caused by an actuator (e.g., actuator 211 depicted in FIGS. 2C and 2D) and one or more displacement amplifiers (e.g., displacement amplifiers 213 depicted in FIGS. 2C-2I).

During the line-scan, returned laser beam 111 may be collected by lens 114 as laser beam 121, which passes through the slit of the slit apparatus. The light passing through the slit impinges on only the row of the Hadamard mask 130 that is aligned with the slit at that point in time. The incoming light passing through Hadamard mask 130 may be larger than the sensitive area of the photodetector array 120. Thus, receiver 104 may include a light collector array 140 (e.g., V-trough light collector, compound parabolic collector (CPC), etc.), which may be configured to enhance the light collection efficiency in front of photodetector array 120.

Photodetector array 120 may have a spatial resolution sufficiently matched to the grid size of Hadamard mask 130. Photons from laser beam 121 that pass through the transparent coded regions of Hadamard mask 130 project onto photodetector array 120. Due to the slit apparatus, a single row of the coded pattern may be projected on photodetector array 120 at any given time. In other words, the light received by photodetector array 120 at a particular time is coded by the pattern of Hadamard mask 130 that is aligned with the slit at that time. As Hadamard mask 130 resonates and shifts in space, the encoded pattern aligned with the slit changes over time, therefore changing the encoding of the received light at photodetector array 120. For each frame, photodetector array 120 may receive multiple lines of light signals corresponding to the rows of encoded patterns on Hadamard mask 130 during a line-scanning procedure. After a certain illumination period (e.g., when each of the rows have been scanned for a particular frame), the received lines of light signals may be decoded to generate an image of the far field environment by the signal processor 124. Signal processor 124 may decode the received signals according to the known encodings on Hadamard mask 130 and its timing sequence. By encoding the received signals through Hadamard mask 130 and then decoding the signals, LiDAR system 100 is able to increase the sub-pixelization of the frame beyond that provided by the pixelization of photodetector array 120.

Photodetector array 120 may convert the laser light (e.g., returned laser beam 111) collected by lens 114 into laser beam 121 into an electrical signal 119 (e.g., a current or a voltage signal). Electrical signal 119 may be generated when photons are absorbed in a photodiode included in photodetector array 120. In some embodiments of the present disclosure, photodetector array 120 may include a PIN detector, a PIN detector array, an avalanche photodiode (APD) detector, a APD detector array, a single photon avalanche diode (SPAD) detector, a SPAD detector array, a silicon photo multiplier (SiPM/MPCC) detector, a SiP/MPCC detector array, or the like.

LiDAR system 100 may also include one or more signal processor 124. Signal processor 124 may receive electrical signal 119 generated by photodetector array 120. Signal processor 124 may process electrical signal 119 to determine, for example, distance information carried by electrical signal 119. Signal processor 124 may construct a point cloud based on the processed information. The point cloud may include a frame, which is an image of the far field at a particular point in time. In this context, a frame is the data/image captured of the far field environment at each scanning angle. Signal processor 124 may include a microprocessor, a microcontroller, a central processing unit (CPU), a graphical processing unit (GPU), a digital signal processor (DSP), or other suitable data processing devices. By including the slit apparatus, Hadamard mask 130, and light collector array 140 in receiver 104, the frame generated by signal processor 124 may have a larger pixel number than photodetector array 120. Therefore, to achieve the same resolution, the Hadamard mask apparatus help reduce the size and cost of the present optical sensing system, e.g., as described in additional detail below in connection with FIGS. 2A, 2B, 2C, 2D, and 3.

Figure 2B:
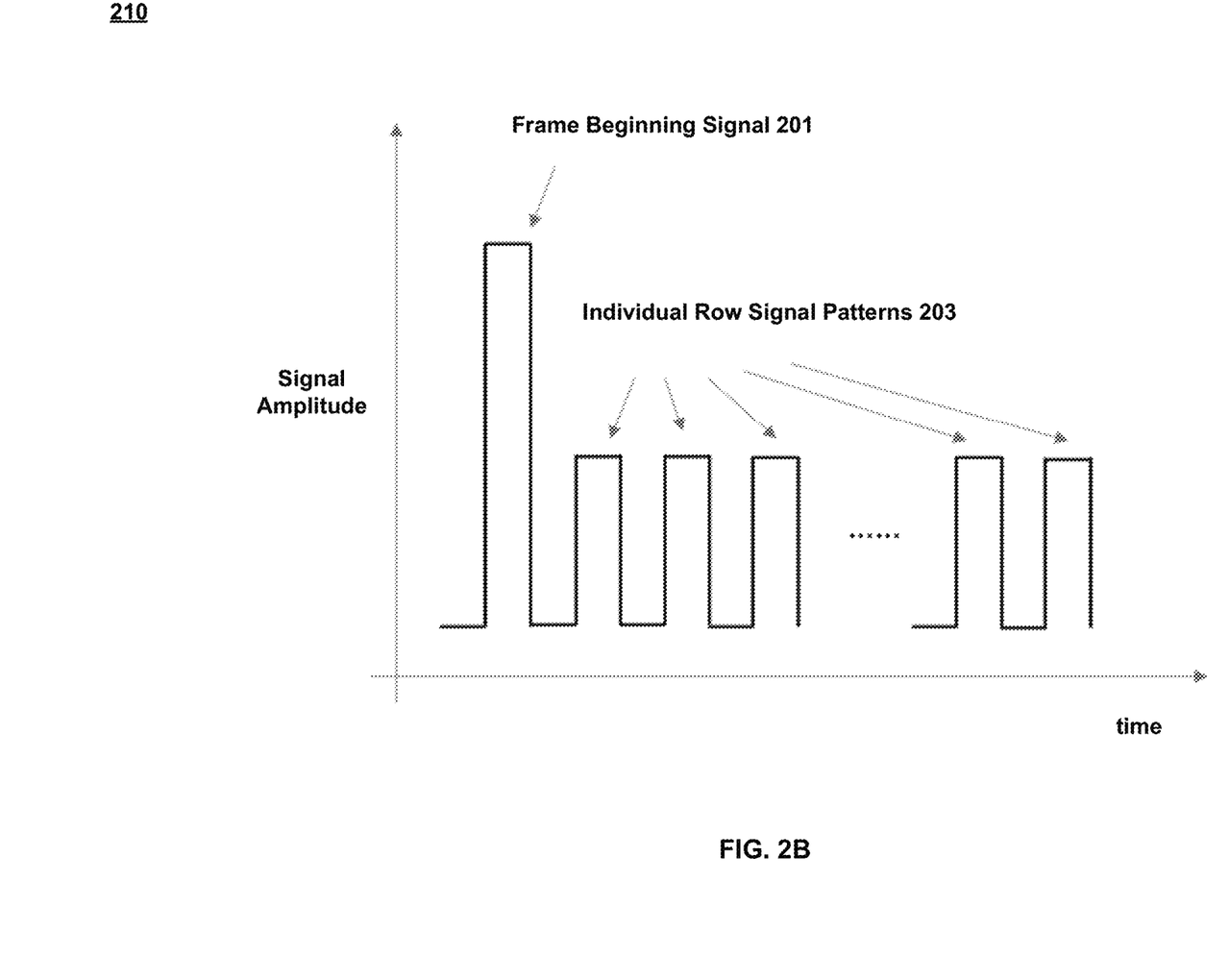
FIG. 2B illustrates a graphical representation of a timing sequence of an exemplary Hadamard mask based scanning procedure, according to embodiments of the disclosure.

FIG. 2A illustrates a diagram 200 of an exemplary Hadamard mask 130 and slit apparatus 150, according to embodiments of the disclosure. FIG. 2B illustrates a graphical representation 210 of a timing sequence of an exemplary Hadamard mask based scanning procedure, according to embodiments of the disclosure. FIG. 2C illustrates a first diagram 215 of an exemplary Hadamard mask apparatus without an applied displacement force, according to embodiments of the disclosure. FIG. 2D illustrates a second diagram 220 of an exemplary Hadamard mask apparatus with an applied displacement force, according to embodiments of the disclosure. FIGS. 2A, 2B, 2C, and 2D will be described together.

As mentioned above, receiver 104 may include a slit apparatus 150, such as the one illustrated in FIG. 2A. Slit apparatus 150 may be a fixed structure that does not oscillate during a scanning procedure and is positioned between the lens 114 and the Hadamard mask 130 illustrated in FIG. 1.

Referring to FIG. 2A, slit apparatus 150 may include a pair of opaque structures 151 configured to block the passage of light. Slit apparatus 150 may also include a slit 160 that is located between the opaque structures 151 and configured to allow the passage of light. Although shown as two structures separated by a slit, slit apparatus 150 may be any shaped structure with a hole and/or slit through which laser beam 121 can pass. Slit 160 may be an opening, a hole, or a transparent material, or any other configuration that allows light to pass unobstructed.

As seen in FIG. 2A, Hadamard mask 130 may include a frame beginning pattern 202 and a coded pattern 204. Frame beginning pattern 202 and different rows of coded pattern 204 may sequentially align with slit 160 during a line-scanning procedure by resonating Hadamard mask 130. Each of the frame beginning pattern 202 and the coded pattern 204 may include opaque regions (depicted with grey in FIGS. 2A, 2C, and 2D), which are configured to block the passage of laser beam 121. Moreover, frame beginning pattern 202 and coded pattern 204 each include transparent regions (depicted with white in FIGS. 2A, 2C, and 2D) configured to allow the passage of laser beam 121.

Depending on the desired sub-pixelization, each row of Hadamard mask 130 may be divided into X first coded regions 206a and Y second coded regions 206b, where X and Y may be the same number or different. Each of first coded regions 206a may be transparent and portions of laser beam 121 that pass through slit 160 may also pass through these first coded regions 206a. On the other hand, second coded regions 206b may be opaque and configured to block the passage of laser beam 121 during the line-scanning procedure. In certain implementations, there may be N rows in coded pattern 204 to provide sufficient information collection at photodetector array 120 and signal processor 124. In certain implementations, the N rows may be equal in number to one or more of the X first coded regions 206a and/or the Y second coded regions 206b. In certain other implementations, the N rows may be different in number than one or more of the X first coded regions 206a and/or the Y second coded regions 206b.

By scanning through each of the rows in Hadamard mask 130, different parts of laser beam 121 containing different information about the far field may then impinge upon photodetector array 120. Using line-scanning of Hadamard mask 130, a larger amount of information can be collected using a photodetector array 120 of reduced size. For example, using Hadamard mask 130 and a line-scanning procedure to implement sub-pixelization, the size of photodetector array 120 may be reduced by N fold, as compared with known systems. The line-scanning procedure is described below.

For example, scanner 108 of FIG. 1 steers laser beam 109 at a particular scanning angle (associated with an individual frame) towards object 112. Then, reflected laser beam 111 is collected by lens 114 into collimated laser beam 121 that passes through slit 160 of slit apparatus 150 and impinges on Hadamard mask 130. At the beginning of a scanning procedure for a new frame, frame beginning pattern 202 is aligned with slit 160 such that laser beam 121 passes through its transparent region and impinges on photodetector array 120. An electrical signal proportional to the number of photons impinging on photodetector array 120 is sent to signal processor 124. Then, Hadamard mask 130 oscillates downward and laser beam 121 impinges on each row of coded pattern 204 sequentially.

Frame beginning pattern 202 may be integrated into Hadamard mask 130 such that the start signal 201 (depicted in FIG. 2B) of each frame can be identified based on the signal amplitude. In some embodiments, frame beginning pattern 202 may include a larger transparent region than the collective size of first coded regions 206a in any row in coded pattern 204 to allow a distinguishable amount of light to pass through. Accordingly, signal processor 124 shown in FIG. 1 may identify the start of a new frame when the received signal has the highest amplitude (e.g., start signal 201). As illustrated in FIG. 2B, the amplitude of start signal 201 is larger than the amplitude of any other individual signal of signal pattern 203, where each individual signal is associated with one of the rows in coded pattern 204. Because the transparent region(s) of frame beginning pattern 202 allows the largest number of photons from laser beam 121 to pass therethrough, the signal amplitude of start signal 201 is distinguishable from those signals in signal pattern 203, where each signal in signal pattern 203 is associated with one row in coded pattern 204.

By forming a frame beginning pattern 202 in Hadamard mask 130, signal processor 124 may identify the beginning of a new frame when the signal amplitude meets a threshold level associated with the start of a new frame. Identifying a new frame based on a signal amplitude may reduce the time and computational resources used by signal processor 124 to identify the start of a new frame in the line-scanning procedure, as compared to using a Hadamard mask without frame beginning pattern 202.

Then, as Hadamard mask 130 resonates, it is shifted row-by-row such that each row of coded pattern 204 receives laser beam 121 sequentially, and photodetector array 120 may output an individual signal of signal pattern 203 containing image/data of the far field environment as encoded by the corresponding row of coded pattern 204. Once each of the rows of coded pattern 204 has been scanned (e.g., once laser beam 121 has impinged on each of the rows), scanner 108 may select the next scanning angle and adjust MEMS mirror 110 such that laser beam 109 is directed toward object 112 at the new scanning angle. While at the same time, Hadamard mask 130 oscillates downward such that the frame beginning pattern 202 is re-aligned with slit 160 of slit apparatus 150 for the start of the new frame. The line-scanning procedure then continues in the same or similar manner as described above for the previous frame. The mechanism by which Hadamard mask 130 is made to oscillate will be described below in connection with the Hadamard mask apparatus of FIGS. 2C and 2D.

Figure 2C:
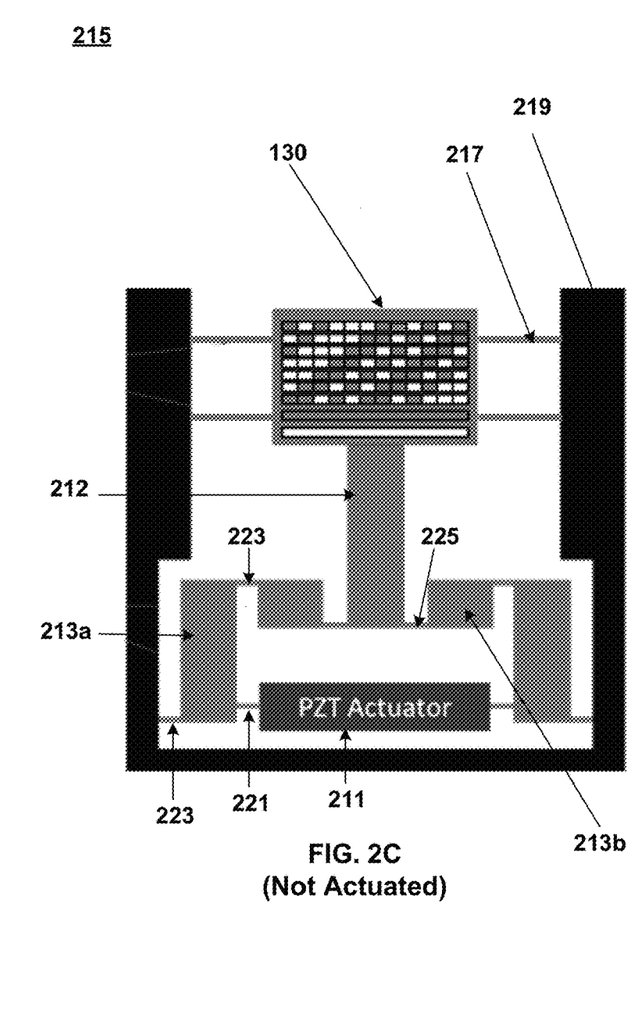
FIG. 2C illustrates a first detailed view of an exemplary Hadamard mask apparatus without an applied displacement force, according to embodiments of the disclosure.
Figure 2D:
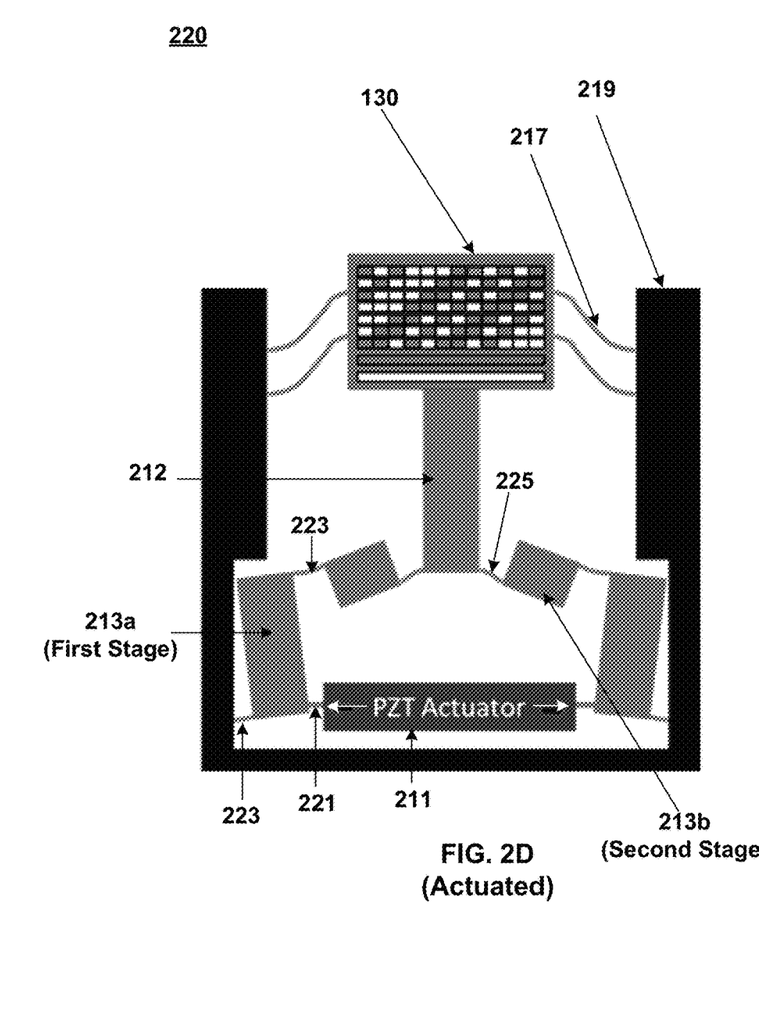
FIG. 2D illustrates a second detailed view of the exemplary Hadamard mask apparatus of FIG. 2C with an applied displacement force, according to embodiments of the disclosure.

Referring to FIGS. 2C and 2D, Hadamard mask 130 may be coupled to a support structure 219 using one or more torsion springs 217. Support structure 219 may be coupled to a substrate or another structure of receiver 104, for example, and thus is fixed. Hadamard mask 130 may be caused to oscillate/resonate using an actuator 211 that is coupled to a series of displacement amplifiers 213 (also referred to as "mechanical amplifiers"), which are also coupled to Hadamard mask 130 directly or through handle 212. Actuator 211 may include a single actuator or multiple actuators. When actuator 211 includes more than one actuator, these actuators may be of the same type (e.g., all piezoelectric) or different types (e.g., electrical and piezoelectric). Displacement amplifiers 213 provide linkage mechanisms that amplify the magnitude of at least one mechanical quantity (e.g., displacement, force, torque, velocity, acceleration) generated by actuator 211 before reaching the Hadamard mask 130.

In the example illustrated in FIGS. 2C and 2D, actuator 211 is a piezoelectric amplifier formed from a piezoelectric material, e.g., such as lead zirconium titanate (PZT). When a voltage is applied to the PZT, actuator 211 deforms, and thus, generates the displacement force. One advantage of using a piezoelectric actuator 211, as compared to electronic and hydraulic type actuators, is the fast response, large generation pressure, and highly accurate operation resonance. While PZT can generate enough power to drive Hadamard mask 130 over a long range, the amount of expansion on PZT itself is not particularly large. Thus, the displacement generated by PZT may be insufficient to drive Hadamard mask 130 to resonance. Hence, by including several stages of displacement amplifiers 213, the displacement generated by PZT may be amplified such that when it reaches Hadamard mask 130 the amplified displacement may be sufficient to drive Hadamard mask 130 to resonate during the line-scanning procedure.

Actuator 211 may be coupled to a first stage of displacement amplifiers 213 via a first connector 221. First connector 221 may be formed from the same or different material than actuator 211. Moreover, first connector 221 may be configured to receive the displacement force generated by the actuator 211 and to apply the force as an input into the first stage of displacement amplifiers 213.

Each displacement amplifier 213 may include an input end and an output end. The input end may include the fulcrum (e.g., hinge 223) and an input location of the force. The output end may be the end coupled to the load, which may be either a displacement amplifier 213 in the subsequent amplification stage or the Hadamard mask 130. Based on the orientation of fulcrum, input force, and load, the displacement generated by the force of the actuator 211 may be amplified such that Hadamard mask 130 is displaced by a larger amount than if it were directly coupled to actuator 211 without the intervening displacement amplifiers 213.

As depicted in FIGS. 2C and 2D, a first stage of displacement amplifiers 213a may be coupled to support structure 219 via a hinge 223, which acts as a fulcrum for the first stage. A second stage of displacement amplifiers 213b may be coupled to the first stage of displacement amplifiers 213a via a different hinge 223. The portion of a mechanical amplifier located between two hinges may be referred to as a "lever arm." The hinge 223 that couples the second stage of displacement amplifiers 213b to the first stage of displacement amplifiers 213a may act as a fulcrum and/or input location of the force applied to the second stage of displacement amplifiers 213b. A second connector 225 may be used to couple the second stage of displacement amplifiers 213b to either the handle 212 or directly to Hadamard mask 130, depending on the configuration. Second connector 225 may be a hinge or any other type of connector that can facilitate displacing Hadamard mask 130 to drive resonance. The amount the displacement is amplified depends on the orientation of the fulcrum/input force/load of each displacement amplifier 213, the respective positions of the fulcrum/input force/load along the lever arm, and the length of the lever arm, among other things.

Although displacement amplifiers 213 are depicted in FIGS. 2C and 2D as class 3 levers, the displacement amplifiers 213 are not limited thereto. For example, displacement amplifiers 213 may include, e.g., buckling structure, a class 1 lever structure, a class 2 lever structure, a parallel four bar structure, a double symmetric four bar structure, a symmetric five bar structure, a gear train, a crank, a cam, a torque amplifier, or a mechanical comparator, just to name a few.

Moreover, it is contemplated that actuator 211 is not limited to the PZT actuator illustrated in FIGS. 2C and 2D. Instead, actuator 211 may be any type of actuator that causes Hadamard mask 130 to resonate during a scanning procedure without departing from the scope of the present disclosure. Displacement amplifiers will be described in additional detail below in connection with FIGS. 2E-2I.

Figure 2E:
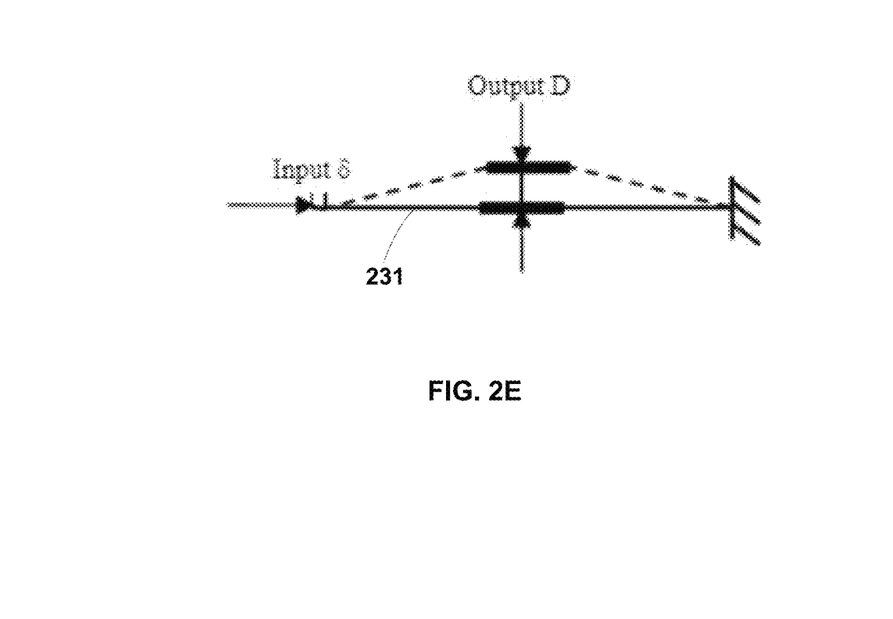
FIG. 2E illustrates a first exemplary displacement amplifier that may be included in the Hadamard mask apparatus of FIGS. 2C and 2D, according to embodiments of the disclosure.
Figure 2F:
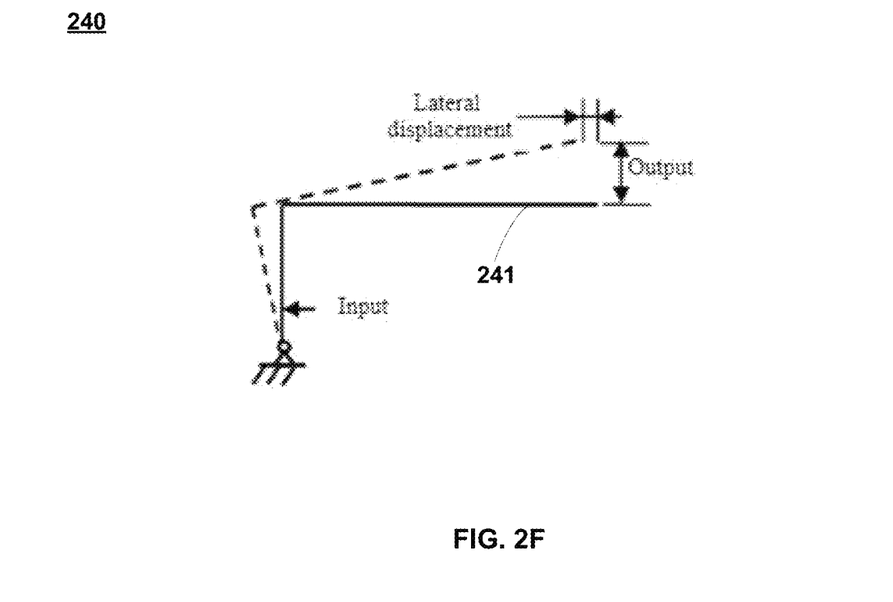
FIG. 2F illustrates a second exemplary displacement amplifier that may be included in the Hadamard mask apparatus of FIGS. 2C and 2D, according to embodiments of the disclosure.
Figure 2G:
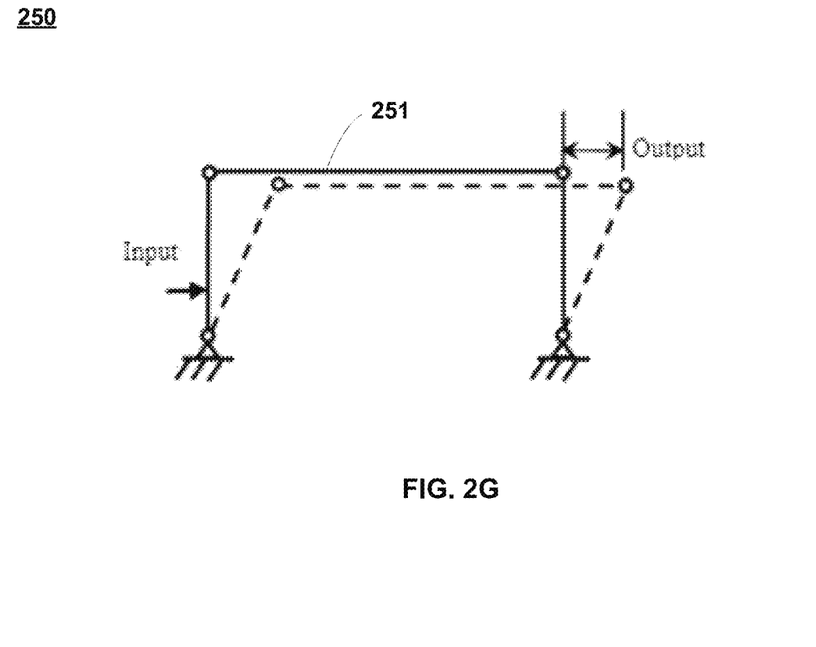
FIG. 2G illustrates a third exemplary displacement amplifier that may be included in the Hadamard mask apparatus of FIGS. 2C and 2D, according to embodiments of the disclosure.
Figure 2H:
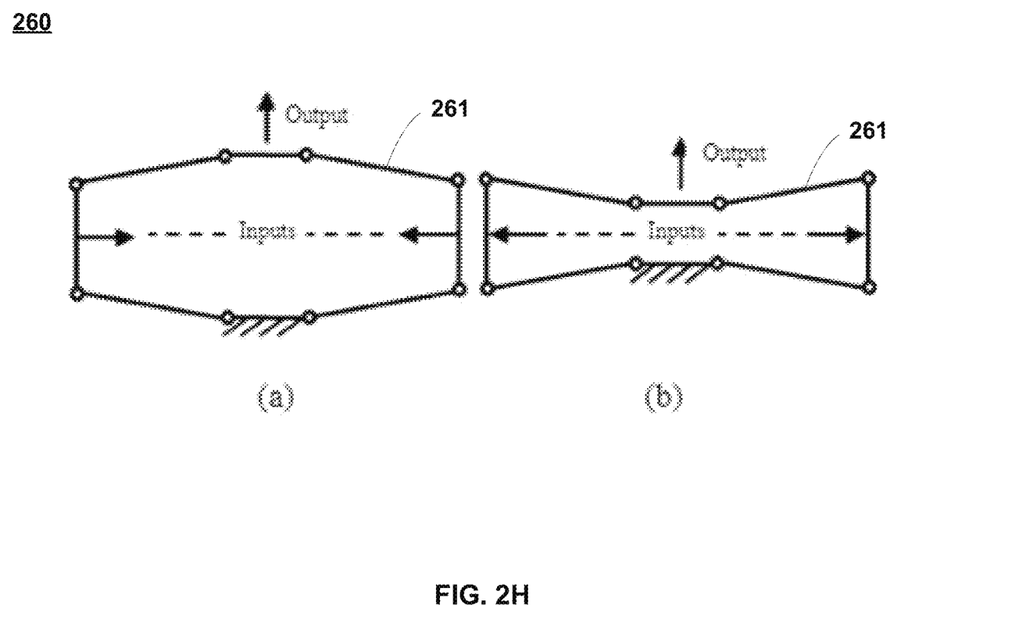
FIG. 2H illustrates a fourth exemplary displacement amplifier that may be included in the Hadamard mask apparatus of FIGS. 2C and 2D, according to embodiments of the disclosure.
Figure 2I:
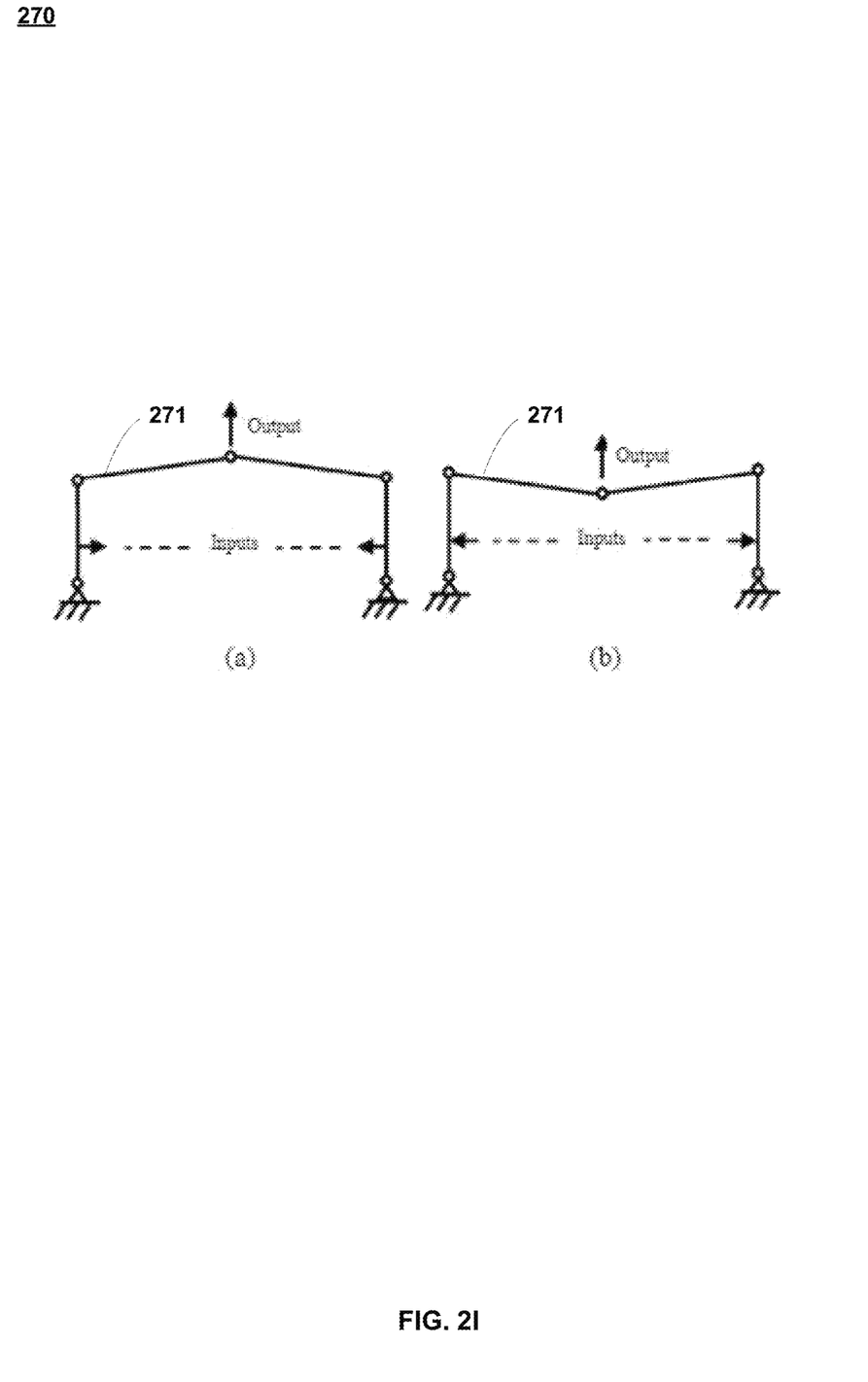
FIG. 2I illustrates a fifth exemplary displacement amplifier that may be included in the Hadamard mask apparatus of FIGS. 2C and 2D, according to embodiments of the disclosure.

FIG. 2E illustrates a first schematic diagram of a buckling topology 230 that may be implemented as displacement amplifier 213 of FIGS. 2C and 2D, according to embodiments of the disclosure. FIG. 2F illustrates a second schematic diagram of a lever topology 240 that may be implemented as displacement amplifier 213 of FIGS. 2C and 2D, according to embodiments of the disclosure. FIG. 2G illustrates a third schematic diagram of a parallel four bar topology 250 that may be implemented as displacement amplifier 213 of FIGS. 2C and 2D, according to embodiments of the disclosure. FIG. 2H illustrates a fourth schematic diagram of a double symmetric four bar topology 260 that may be implemented as displacement amplifier 213 of FIGS. 2C and 2D, according to embodiments of the disclosure. FIG. 2I illustrates a fifth schematic diagram of a symmetric five bar topology 270 that may be implemented as displacement amplifier 213 of FIGS. 2C and 2D, according to embodiments of the disclosure. FIGS. 2E-2I will be described together.

As used herein, topology refers to the connectivity among materials without involving the geometry of the materials that form displacement amplifier 213. The topology of each displacement amplifier 213 thus contains the fundamental features that are responsible for the characteristics and performances of each displacement amplifier 213. Each of the mechanical amplifiers in FIGS. 2C and 2D may include the same topology or different topologies depending on the implementation. Each of the displacement amplifiers 213 may receive a displacement force as an input from one or more actuators 211 or the previous stage of displacement amplifiers. The one or more actuators 211 may be of the same or different type.

As depicted in FIG. 2E, a long slender beam 231 subjected to an axial compressive force will buckle when the force exceeds a critical value. As shown in FIG. 2E, if the slender beam 231 has an axial deformation δ, a transverse deformation D can be produced. Thus, in this implementation, displacement amplifier 213 may amplify the displacement force using the buckling principle to amplify the displacement by deformation distance D. Here, the displacement force generated by actuator 211 must be greater than or equal to the critical value of the beam 231 to produce the buckling, which can be used to amplify the displacement force, which is output to the next stage of mechanical amplifier(s), handle 212, and/or Hadamard mask 130 depending on the configuration.

As depicted in FIG. 2F, another amplification mechanism by which to increase the displacement of actuator 211 is using a mechanical lever arm 241. Based on this topology (class 3 lever), when the displacement force of actuator 211 is applied to mechanical lever arm 241 of displacement amplifier 213, displacement amplifier 213 may amplify the displacement force as an output to the next stage of mechanical amplifier(s), handle 212, and/or Hadamard mask 130 depending on the configuration. However, this topology may also generate a lateral displacement at the end of the lever arm 241 and reduce the system stiffness, which may be undesirable in certain implementations. Based on the lever topology 240, a doubled lever structure and multiple lever arm amplification devices may also be implemented as displacement amplifier 213.

As depicted in FIG. 2G, to increase the stiffness of the displacement amplifiers 213, a parallel four bar structure 251 can be used. Here, the displacement force of actuator 211 may be input to the parallel four bar structure 251 of displacement amplifier 213, which amplifies the displacement force when the bar structure moves to a new position when the displacement force is input thereto. Although the system stiffness is increased compared with the lever arm structure of FIG. 2F, lateral displacement may still occur using this parallel four bar topology 250.

As depicted in FIG. 2H, to eliminate the lateral displacement of the topologies depicted in FIGS. 2F and 2G, a double symmetric four-bar structure 261 may be used as displacement amplifier 213. FIG. 2H illustrates two double symmetric four-bar topologies 260: (a) actuator 211 compression and (b) actuator 211 extension. Topology (b) in FIG. 2H may be geared towards PZT actuator characteristics through extension deformation. Here, the inputs may be the displacement force of one or more actuators 211, and the double symmetric four-bar structure 261 may output an amplified displacement force to the next stage of mechanical amplifier(s), handle 212, and/or Hadamard mask 130 depending on the configuration based on a movement of the connected bar structures.

Referring to FIG. 2I, the symmetric five-bar structure 271 may have two-degrees of freedom that may provide an x-y plane displacement. If the five-bar linkage of FIG. 2I is designed to be symmetrical, and the two driving links rotate simultaneously in opposite directions driven by a single actuator 211, the output of the mechanism can be in one direction only. FIG. 2I illustrates two symmetric five-bar topologies 270: (a) actuator 211 compression and (b) actuator 211 extension. Here, topology (b) may be better suited for a PZT actuator 211. The symmetric five-bar structure 271 may also be viewed as a combination of the double symmetric four-bar topology 260 of FIG. 2H and the lever arm topology 240 of FIG. 2F. Therefore, the symmetric five-bar structure 271 may provide the advantages of the double symmetric four-bar structure 261 and the lever arm 241. The main advantage of the topology 270 in FIG. 2I, compared with the double symmetric four bar topology 260, is the high natural frequency and high amplification ratio in a compact size.

Figure 3:
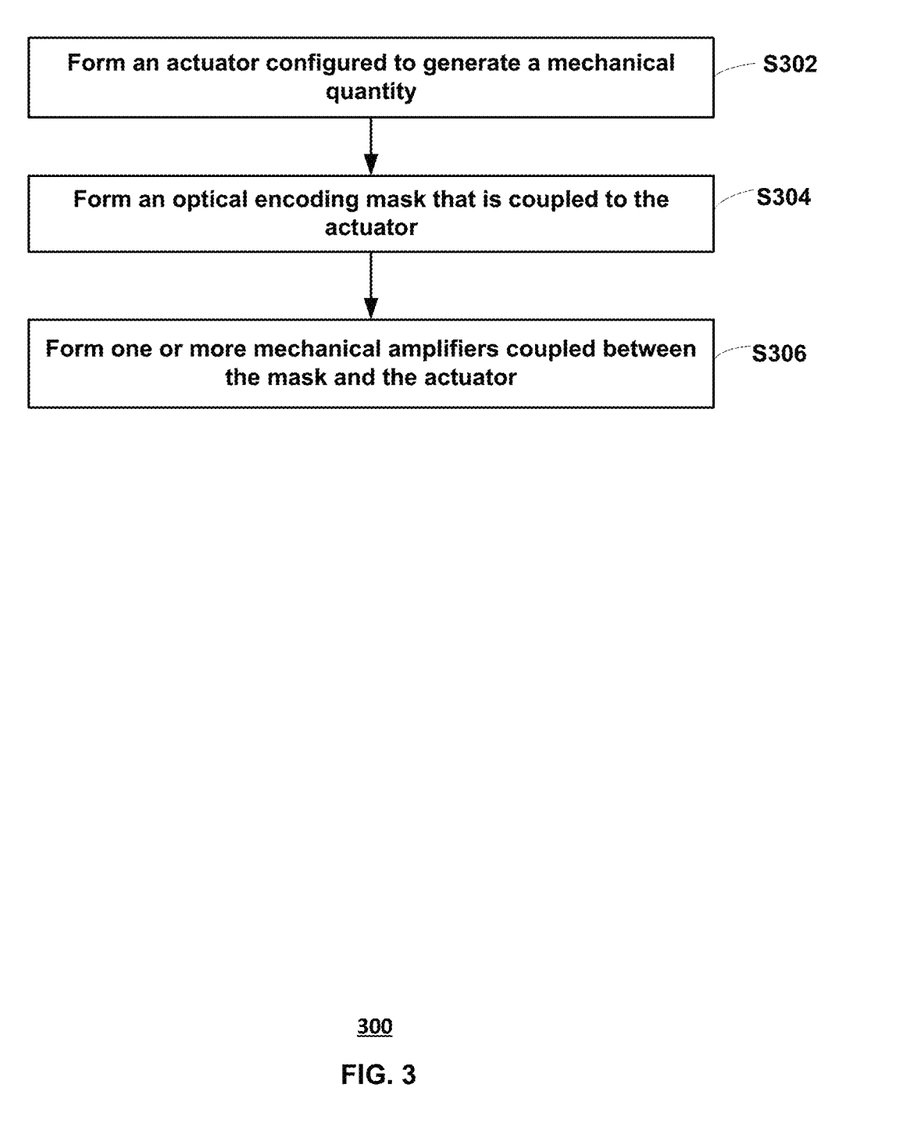
FIG. 3 illustrates a flow chart of an exemplary method of forming an exemplary Hadamard mask apparatus, according to embodiments of the disclosure.

FIG. 3 illustrates a flowchart of an exemplary method 300 of forming a mask apparatus used in an optical sensing system, according to embodiments of the disclosure. Exemplary method 300 may be performed as a fabrication process, e.g., such as a MEMS fabrication process. Method 300 may include steps S302-S306 as described below. The corresponding structures formed in steps S302-S306 may all be formed using MEMS processing and formed in a same MEMS structure. Although certain structures formed using steps S302-S306 may be formed using a different fabrication technique and then coupled to the structures that were formed using the MEMS technique. It is to be appreciated that some of the steps may be optional, and some of the steps may be performed simultaneously, or in a different order than shown in FIG. 3.

Referring to FIG. 3, at step S302, the method 300 may include forming an actuator configured to generate a force. For example, referring to FIGS. 2C and 2D, actuator 211 is a piezoelectric amplifier formed from a piezoelectric material, e.g., such as lead zirconium titanate (PZT). When a voltage is applied to the PZT, actuator 211 deforms, and thus, generates the displacement force. Advantages of using a piezoelectric actuator 211, as compared to electronic and hydraulic type actuators, include the fast response, large generation pressure, and highly accurate operation resonance. Alternatively, actuator 211 may be formed as an electrical actuator, mechanical actuator, electromechanical actuator, or drive comb, etc.

At step S304, the method may include forming an optical encoding mask, such as Hadamard mask 130, which may resonate when driven by the force generated by actuator 211. For example, referring to FIG. 2A, Hadamard mask 130 may include a frame beginning pattern 202 and a coded pattern 204. Frame beginning pattern 202 and different rows of coded pattern 204 may sequentially align with slit 160 during a line-scanning procedure by resonating Hadamard mask 130. Each of the frame beginning pattern 202 and the coded pattern 204 may include opaque regions (depicted with grey in FIGS. 2A, 2C, and 2D), which are configured to block the passage of laser beam 121. Moreover, frame beginning pattern 202 and coded pattern 204 each include transparent regions (depicted with white in FIGS. 2A, 2C, and 2D) configured to allow the passage of laser beam 121. Depending on the desired sub-pixelization, each row of Hadamard mask 130 may be divided into X first coded regions 206a and Y second coded regions 206b, where X and Y may be the same number or different. Each of first coded regions 206a may be transparent and portions of laser beam 121 that pass through slit 160 may also pass through these first coded regions 206a. On the other hand, second coded regions 206b may be opaque and configured to block the passage of laser beam 121 during the line-scanning procedure. In certain implementations, there may be N rows in coded pattern 204 to provide sufficient information collection at photodetector array 120 and signal processor 124. In certain implementations, the N rows may be equal in number to one or more of the X first coded regions 206a and/or the Y second coded regions 206b. In certain other implementations, the N rows may be different in number than one or more of the X first coded regions 206a and/or the Y second coded regions 206b. Hadamard mask 130, actuator 211, and displacement amplifiers 213 may be formed as the same MEMS structure.

At step S306, the method 300 may include forming one or more mechanical amplifiers coupled between the mask and the actuator. The one or more mechanical amplifiers may be configured to amplify a displacement associated with the force generated by the actuator. For example, referring to FIGS. 2C and 2D, displacement amplifiers 213 are linkage mechanisms that amplify the magnitude of the displacement generated by actuator 211. As described in step 302, actuator 211 may be formed from PZT. While PZT can generate enough power to drive Hadamard mask 130 over a long range, the amount of expansion on PZT itself is not particularly large. Hence, by utilizing several stages of displacement amplifiers 213, the displacement applied to Hadamard mask 130 may be increased such that it may perform the oscillation function described above in connection to the line-scanning procedure. Displacement amplifiers 213 may be formed using MEMS fabrication in the same MEMS structure as Hadamard mask 130 and/or actuator 211. However, displacement amplifiers 213 may be formed separately and then coupled to actuator 211 and Hadamard mask 130.

Although the formation of the actuator, the optical encoding mask, and the amplifiers are described in connection with FIG. 3 in the particular order as illustrated, they may not necessarily be formed in that order during the MEMS fabrication process. For example, the amplifiers may be formed before the optical encoding mask. As another example, certain components may be formed in parallel and bonded together to form the mask apparatus.

It is intended that the specification and examples be considered as exemplary only, with a true scope being indicated by the following claims and their equivalents.

What is claimed is:

1. A mask apparatus used in an optical sensing system, comprising:
   an optical encoding mask configured to facilitate a scanning procedure of the optical sensing system, wherein the scanning procedure comprises a plurality of scanning lines; and
   an actuator coupled to the optical encoding mask and configured to generate a force to drive the optical encoding mask to resonate in a direction perpendicular to the scanning lines during the scanning procedure,
   wherein the optical encoding mask comprises a frame beginning pattern identifying a start of a frame captured by the optical sensing system during the scanning procedure.

2. The mask apparatus of claim 1, wherein the actuator comprises at least one of an electric actuator, a mechanical actuator, an electro-mechanical actuator, or a piezoelectric actuator.

3. The mask apparatus of claim 2, wherein the piezoelectric actuator comprises lead zirconate titanate (PZT).

4. The mask apparatus of claim 3, wherein when the actuator includes the piezoelectric actuator, the apparatus further comprises:
   at least one electrode coupled to the piezoelectric actuator and configured to apply a voltage thereto,
      wherein the piezoelectric actuator is configured to contract or expand when the voltage is applied thereto to generate the force to drive the optical encoding mask to resonate.

5. The mask apparatus of claim 1, further comprising:
   one or more mechanical amplifiers coupled between the optical encoding mask and the actuator.

6. The mask apparatus of claim 5, wherein the one or more mechanical amplifiers comprise at least one of a buckling structure, a lever structure, a parallel four bar structure, a double symmetric four bar structure, a symmetric five bar structure, a gear train, a crank, a cam, a torque amplifier, or a mechanical comparator.

7. The mask apparatus of claim 5, wherein the one or more mechanical amplifiers includes at least one class 3 lever configured to receive the force as an input and amplify a displacement associated with the force as an output.

8. The mask apparatus of claim 7, wherein the at least one class 3 lever includes a plurality of class 3 levers connected by hinges.

9. The mask apparatus of claim 7, wherein the at least one class 3 lever comprises:
   a lever arm with an input end and an output end;
   a hinge that couples the input end of the lever arm to a fixed support structure;
   a first connector that couples the lever arm to the actuator at a location between the hinge and the output end and configured to receive the force from the actuator; and
   a second connector that couples the output end of the lever arm to the optical encoding mask and configured to apply the amplified displacement to the optical encoding mask to drive resonance.

10. The mask apparatus of claim 9, further comprising:
    one or more torsion springs configured to couple the optical encoding mask to the fixed support structure and to cause the optical encoding mask to resonate during the scanning procedure.

11. The mask apparatus of claim 10, wherein one or more of one or more of the actuator, the optical encoding mask, the one or more mechanical amplifiers, the fixed support structure, or the one or more torsion springs are formed on a same microelectromechanical system (MEMS) structure.

12. The mask apparatus of claim 1, wherein the optical encoding mask further comprises:
a coded pattern configured to provide sub-pixelization of the frame.

13. The mask apparatus of claim 12, wherein the coded pattern comprises a plurality of coded regions arranged in a plurality of rows, wherein each coded region is designed to either pass or block light.

14. The mask apparatus of claim 13, wherein the optical encoding mask is a Hadamard mask, wherein the plurality of coded regions are encoded according to a Hadamard matrix.

15. The mask apparatus of claim 13, wherein the apparatus is placed in front of a photodetector array of the optical sensing system, wherein the optical encoding mask moves relative to the photodetector array as it resonates such that the plurality of rows of coded regions are aligned with the photodetector array sequentially during the scanning procedure.

16. A mask apparatus, comprising:
a mask comprising a plurality of patterns, wherein the plurality of patterns comprises a frame beginning pattern identifying to a start of a frame captured by an optical sensing system during a scanning procedure; and
an actuator coupled to the mask and configured to generate a force to drive the mask to resonate in a direction perpendicular to the patterns,
wherein the mask and the actuator are formed in a same microelectromechanical system (MEMS) structure.

17. The mask apparatus of claim 15, further comprising:
one or more mechanical amplifiers coupled between the mask and the actuator,
wherein the one or more mechanical amplifiers includes at least one class 3 lever configured to receive the force as an input and amplify a displacement associated with the force as an output.

18. The mask apparatus of claim 17, wherein the at least one class 3 lever includes a plurality of class 3 levers connected by hinges.

19. The mask apparatus of claim 17, wherein the at least one class 3 lever comprises:
a lever arm with an input end and an output end;
a hinge that couples the input end of the lever arm to a fixed support structure;
a first connector that couples the lever arm to the actuator at a location between the hinge and the output end and configured to receive the force from the actuator; and
a second connector that couples the output end of the lever arm to the optical encoding mask and configured to apply the amplified displacement to the optical encoding mask to drive resonance.

20. A method of forming a mask apparatus, comprising:
forming an actuator configured to generate a force;
forming an optical encoding mask that is coupled to the actuator, the optical encoding mask being configured to resonate when driven by the force; and
forming one or more mechanical amplifiers coupled between the optical encoding mask and the actuator, the one or more mechanical amplifiers being configured to amplify a displacement associated with the force generated by the actuator,
wherein the optical encoding mask, the actuator, and the one or more mechanical amplifiers are formed in a same microelectromechanical system (MEMS) structure,
wherein the optical encoding mask comprises a frame beginning pattern identifying to a start of a frame captured by an optical sensing system during a scanning procedure.

* * * * *